United States Patent
Melenboim

(10) Patent No.: US 9,992,528 B2
(45) Date of Patent: Jun. 5, 2018

(54) SYSTEM AND METHODS THEREOF FOR DISPLAYING VIDEO CONTENT

(71) Applicant: Ani-View Ltd., Herzliya (IL)

(72) Inventor: Tal Melenboim, Ashdod (IL)

(73) Assignee: Ani-View Ltd., Tel Aviv (IS)

( * ) Notice: Subject to any disclaimer, the term of this patent is extended or adjusted under 35 U.S.C. 154(b) by 84 days.

(21) Appl. No.: 14/950,057

(22) Filed: Nov. 24, 2015

(65) Prior Publication Data
US 2016/0080801 A1 Mar. 17, 2016

Related U.S. Application Data

(63) Continuation-in-part of application No. PCT/IL2014/050380, filed on Apr. 24, 2014, and a
(Continued)

(51) Int. Cl.
*H04N 21/435* (2011.01)
*H04N 21/258* (2011.01)
(Continued)

(52) U.S. Cl.
CPC ..... *H04N 21/4358* (2013.01); *H04N 21/2343* (2013.01); *H04N 21/2393* (2013.01);
(Continued)

(58) Field of Classification Search
CPC ....... H04N 21/44209; H04N 21/47202; H04N 21/2181; H04N 21/2343; H04N 21/2393;
(Continued)

(56) References Cited

U.S. PATENT DOCUMENTS

| 5,673,205 A | 9/1997 | Brunson |
|---|---|---|
| 6,052,492 A | 4/2000 | Bruckhaus |

(Continued)

FOREIGN PATENT DOCUMENTS

| KR | 20090064486 | 9/2009 |
|---|---|---|
| WO | 02061610 | 8/2002 |
| WO | 2012029884 | 5/2012 |

OTHER PUBLICATIONS

Unknown Author, "ffmpeg Documentation," Mar. 24, 2012 [Retrieved on Nov. 20, 2015]. Retrieved from the internet: URL <http://web.archive.org/web/20120324154626/http:/ffmpeg.org/ffmpeg.html> 83 pages.

*Primary Examiner* — Omar S Parra
(74) *Attorney, Agent, or Firm* — Fish & Richardson P.C.

(57) ABSTRACT

A system is configured to display a video clip on a display of a user device. The system receives a request from the user device to display the video clip. The system then queries an advertiser server to identify the video clip. The system fetches the identified video clip. The system then extracts from the fetched video clip its video content. The video content is a plurality of frames. The system then determines a type of the user device. Then, the system determines a number of frames per second for the user device. The system generates a plurality of images from the plurality of frames. The system further generates a timing sequence for displaying each of the plurality of images of the imagized video clip on the display of the user device. The system then sends the imagized video clip and the timing sequence to the user device.

20 Claims, 4 Drawing Sheets

Related U.S. Application Data continuation-in-part of application No. PCT/IL2014/051053, filed on Dec. 4, 2014.

(60) Provisional application No. 61/833,025, filed on Jun. 10, 2013, provisional application No. 62/006,179, filed on Jun. 1, 2014, provisional application No. 62/157,470, filed on May 6, 2015.

(51) Int. Cl.
*H04N 21/81* (2011.01)
*H04N 21/2343* (2011.01)
*H04N 21/239* (2011.01)
*H04N 21/472* (2011.01)

(52) U.S. Cl.
CPC . *H04N 21/25858* (2013.01); *H04N 21/47202* (2013.01); *H04N 21/812* (2013.01); *H04N 21/818* (2013.01)

(58) Field of Classification Search
CPC ....... H04N 21/25833; H04N 21/25858; H04N 21/4113; H04N 21/4143; H04N 21/4181; H04N 21/42607; H04N 21/4358; H04N 21/443; H04N 21/4433; H04N 21/454; H04N 21/4622

See application file for complete search history.

(56) References Cited

U.S. PATENT DOCUMENTS

| | | | |
|---|---|---|---|
| 7,734,503 | B2 | 6/2010 | Agarwal et al. |
| 8,107,929 | B2 | 1/2012 | Citrin |
| 8,340,654 | B2 | 12/2012 | Bratton et al. |
| 2009/0125374 | A1 | 5/2009 | Deaton et al. |
| 2010/0118038 | A1* | 5/2010 | Labour ................... G06F 21/53 345/522 |
| 2011/0119716 | A1* | 5/2011 | Coleman, Sr. ......... H04N 7/181 725/62 |
| 2011/0173071 | A1* | 7/2011 | Meyer ................ G06Q 30/0256 705/14.54 |
| 2011/0218861 | A1 | 9/2011 | Pelamourgues et al. |
| 2012/0004982 | A1* | 1/2012 | Cohee ................... G06Q 30/02 705/14.42 |
| 2012/0086785 | A1 | 4/2012 | Valin |
| 2012/0194734 | A1 | 8/2012 | McConville et al. |
| 2013/0111056 | A1* | 5/2013 | Prasad ............. H04N 21/44209 709/231 |

\* cited by examiner

SYSTEM AND METHODS THEREOF FOR DISPLAYING VIDEO CONTENT

CROSS REFERENCE TO RELATED APPLICATIONS

This application is a continuation-in-part of and claims the benefit of PCT Application No. PCT/IL2014/050380 filed on Apr. 24, 2014 that claims the benefit of U.S. Provisional Application No. 61/833,025 filed on Jun. 10, 2013, the contents of which are herein incorporated by reference for all that it contains.

This application is a continuation-in-part of and claims the benefit of PCT Application No. PCT/IL2014/051053 filed on Dec. 4, 2014 that claims the benefit of U.S. Provisional Application No. 62/006,179 filed on Jun. 1, 2014, the contents of which are herein incorporated by reference for all that it contains.

This application claims the benefit of U.S. Provisional Application No. 62/157,470 filed on May 6, 2015, the contents of which are herein incorporated by reference for all that it contains.

TECHNICAL FIELD

The disclosure generally relates to systems for playing video content, and more specifically to systems and methods for converting video content to imagized video content and displaying the imagized video content on user devices.

BACKGROUND

The Internet, also referred to as the worldwide web (WWW), has become a mass media where the content presentation is largely supported by paid advertisements that are added to web-page content. Typically, advertisements displayed in a web-page contain video elements that are intended for display on the user's display device.

Mobile devices such as smartphones are equipped with mobile browsers through which users access the web. Such mobile browsers typically cannot display autoplayed video clips on mobile web pages as the mobile HTML5 video component does not allow autoplay and requires user interaction such as clicking on the page in order to start the video play. The term autoplay refers to starting playing a video on an HTML page when the page is loaded without requiring a user interaction such as clicking on the page. Furthermore, there are multiple video formats supported by different phone manufactures which makes it difficult for the advertisers to know which phone the user has, and what video format to broadcast it with.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
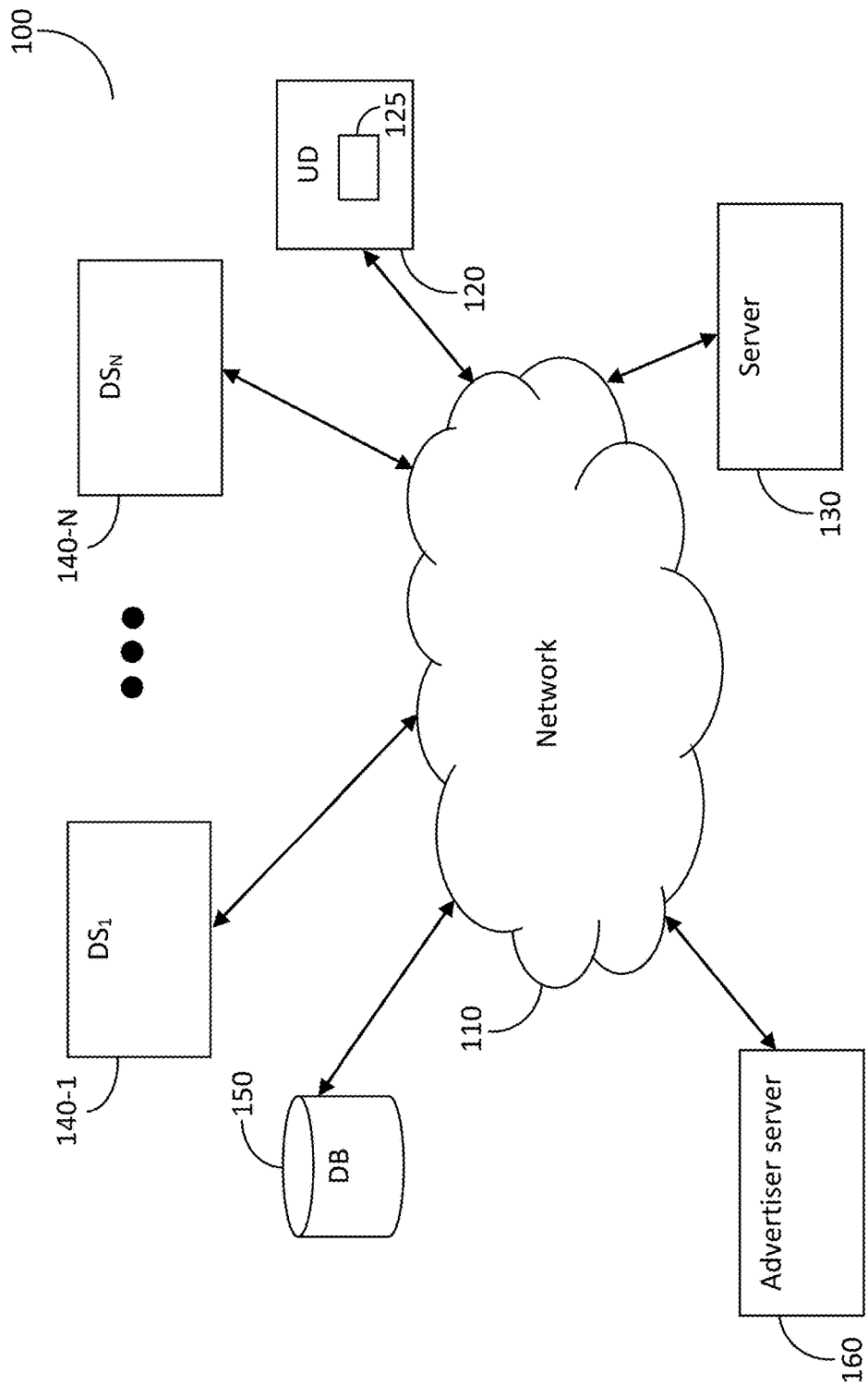
FIG. 1—is a system for generating imagized video clip streams respective of video content according to an embodiment.

It is important to note that the embodiments disclosed herein are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein are only examples of the many possible advantageous uses and implementations of the innovative teachings presented herein.

Figure 4:
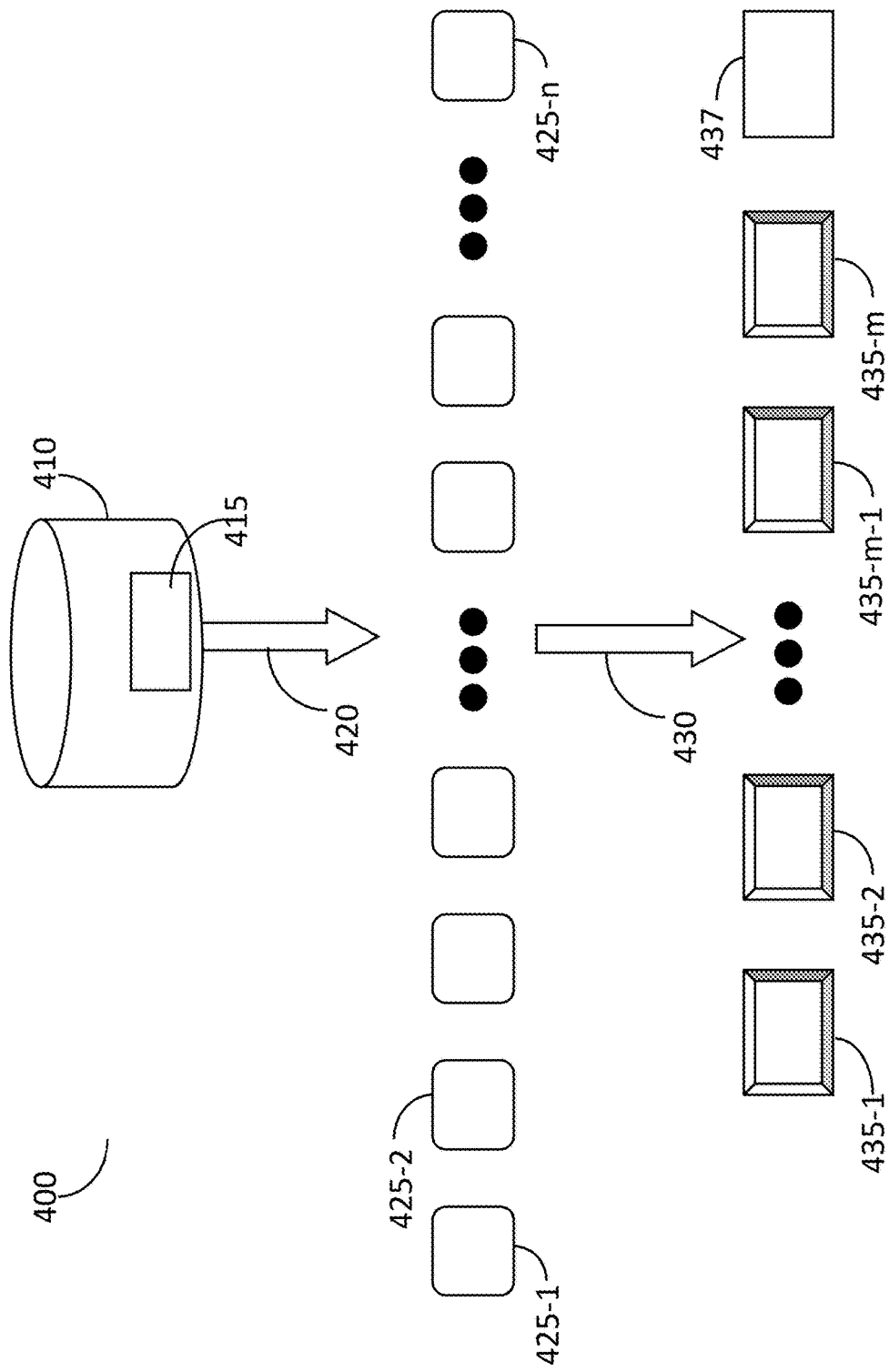
FIG. 4—is a schematic diagram of the operation of a system for displaying imagized video content according to an embodiment.

A system is configured to generate an imagized video clip respective of a video clip (see FIG. 4, element 415). The system receives electronically (see FIG. 4, element 420) at least one video clip. The system analyzes the video clip (see FIG. 4, generation of frames 425 that comprise the video clip) and generates (see FIG. 4, element 430) a plurality of images (see FIG. 4, images 435) respective thereto as well as a timing sequence file (see FIG. 4, element 437). The system is then configured to generate an imagized video clip respective of the plurality of images and the timing sequence file. The system is further configured to display the imagized video clip in a sequence at certain timing, thereby providing an output of a video clip respective of the imagized video clip.

In order to enable a rich interactive in-stream ad experience, a universal specification was developed for interaction between ad units and video players focused on the technology named video player ad-serving interface definition (VPAID) VPAID was designed to work across multiple platforms, many of which include various mobile devices. VPAID is designed to work with a standard HTML5 video player and as a result, VPAID interactions are limited in mobile devices where HTML5 video player functionality is limited. HTML5 video player limitations include for example: lack of auto-play of video content where a user must click on the video content in order to play it, video play in IOS® operating system is done through the native video player and does not allow play through a web page, HTML5 video player is not designed to enable autoplay of video content, and more. By converting the video content (e.g., video frames) to an imagized video clip as further described herein below, and by providing VPAID interface with an emulated video player instead of the original HTML5 video player, such features are enabled and the difficulties associated with displaying VPAID on mobile devices is overcome.

In order to initialize the VPAID interface with an emulated video player that supports such features, an emulated video player is instantiated in a way that it includes all required HTML5 video player methods, properties and events and therefore emulates all HTML5 video player functionalities.

When initializing VPAID on a user device, it is required to send a request to, for example, an initAd ( ) method from a data source 140. In 'environmentVars' object, a reference to 'videoSlot' representing the HTML5 video player should be initiated. According to this disclosure, instead of passing an instance of the HTML5 video object, in this embodiment an initiation of the emulated video player is made by the server 130 where the emulated video player supports all required HTM5 methods, properties and events thereby allowing VPAID interface to render the video through the emulated video player instead of the HTML5 video player. It should be clear for one of ordinary skill in the art that other methods, properties and/or events may be used for initialization as described hereinabove.

In other embodiments described herein, other standards may be used in order to play the video content. However, in all such cases HTML5 video elements are used in order to play the video. In some cases, the HTML5 video object is passed as a parameter and in such cases the emulated video player is launched instead. In other cases, the HTML5 video element may be created dynamically, for example by calling document createElement ("video") or by other methods known to a person of ordinary skill in the art. In these cases the function used to create or locate the HTML5 video element is emulated and when identifying the call to create the element, the emulated video player is created and returned instead of the HTML5 video element.

FIG. 1 depicts an exemplary and non-limiting diagram of a system 100 for generating imagized video clips respective of video content according to an embodiment. The system 100 comprises a network 110 the enables communications between various portions of the system 100. The network may comprise the likes of busses, local area network (LAN), wide area network (WAN), metro area network (MAN), the worldwide web (WWW), the Internet, as well as a variety of other communication networks, whether wired or wireless, and in any combination, that enable the transfer of data between the different elements of the system 100. The system 100 further comprises a user device 120 connected to the network 110. The user device 120 may be, for example but without limitations, a smart phone, a mobile phone, a laptop, a tablet computer, a wearable computing device, a personal computer (PC), a smart television and the like. The user device 120 comprises a display unit 125 such as a screen, a touch screen, etc.

A server 130 is further connected to the network 110. The server 130 is configured to receive a request to display at least one video content item on the display unit 125 of the user device 120. The video content item comprises a plurality of frames that create the video content item. The request is received over the network 110. According to one embodiment, the request may be received as a user's gesture over the display unit 125 of the user device 120. According to another embodiment, the request may be received through an application program installed on the user device 120.

The system 100 further comprises one or more data sources 140-1 through 140-N (collectively referred hereinafter as data sources 140 or individually as a data source 140, merely for simplicity purposes), where N is an integer equal to or greater than 1. The data sources 140 are accessible through the network 110 and configured to store video content. The data sources 140 may be operative by one or more advertiser servers 160.

Respective of the request for the at least one video content, the server 130 is configured to query an advertiser server 160 to identify the video content. Respective of an answer to the query received from the advertiser server 160, the at least one video content item is fetched. The fetching may be made from a data source, for example the data source 140-1. The query may include additional metadata that assists in the identification of the at least one video content and thereby assists in the fetching of the at least one video content from the data source 140-1. The server 130 then extracts a plurality of frames from the video content. The amount of frames is determined by the server 130 based on, for example, determination of a type of the user device 120 requesting the video content. As an example, in case the user device 120 is an iPhone® smartphone, a certain amount of frames may be extracted while in case the user device 120 is an Android® smartphone, the amount of frames extracted may be different. According to another embodiment, the amount of frames extracted is determined respective of an analysis of the video content. The number of frames per second may be smaller than the number of frames per second of the video clip. The analysis enables the server 130 to determine a minimum amount of frames required for an optimal performance of display.

The server 130 is then configured to generate a plurality of images respective of the extracted frames wherein at least one of the plurality of images is created from at least two different frames of the extracted plurality of frames. Prior art solutions introduced the idea of Animated GIF files where a number of "frames" are put together in a single file that could be played back at an interframe duration set in a file. Additionally, each frame could be used to update only a portion of the whole image to help in compression. This format, however, does not allow downloading images at a rate or bit encoding based on the observed network. Generating, as described herein, is the process of extracting existing frames and then saving them in a different format. Generating an image respective of a video content as further described herein, typically involves two or more frames composited to a single image. This generated image was never a part of the original video content, as opposed to frame images which are by definition a part of the original video content, regardless of the format they are stored in.

According to another embodiment, the server 130 is further configured to cluster the images to one or more streams of images for further processing by the server 130.

The server 130 is then configured to generate a timing sequence for displaying the plurality of images or streams of images as an imagized video clip on the display unit 125 of the user device 120. The timing sequence enables the display of the imagized video clip as a video content. According to one embodiment, the timing sequence is generated respective of the type of the user device 120 and/or the display unit 125. As a non-limiting example, upon determination by the server 130 that the user device 120 is a smart phone a timing sequence of ten images per second is determined while upon determination that the user device 120 is a PC, a timing sequence of 20 images per second is determined. In other embodiment the image sequence includes 15 images per 2 seconds.

The server 130 is then configured to send the imagized video clip and the timing sequence to the user device 120 for display on the display unit 125, in compliance with VPAID. Optionally, the system 100 further comprises a database 150. The database is configured to store data related to requests received from the user device 120, imagized video clips and the video content from which the imagized video clips were generated, etc.

Figure 2:
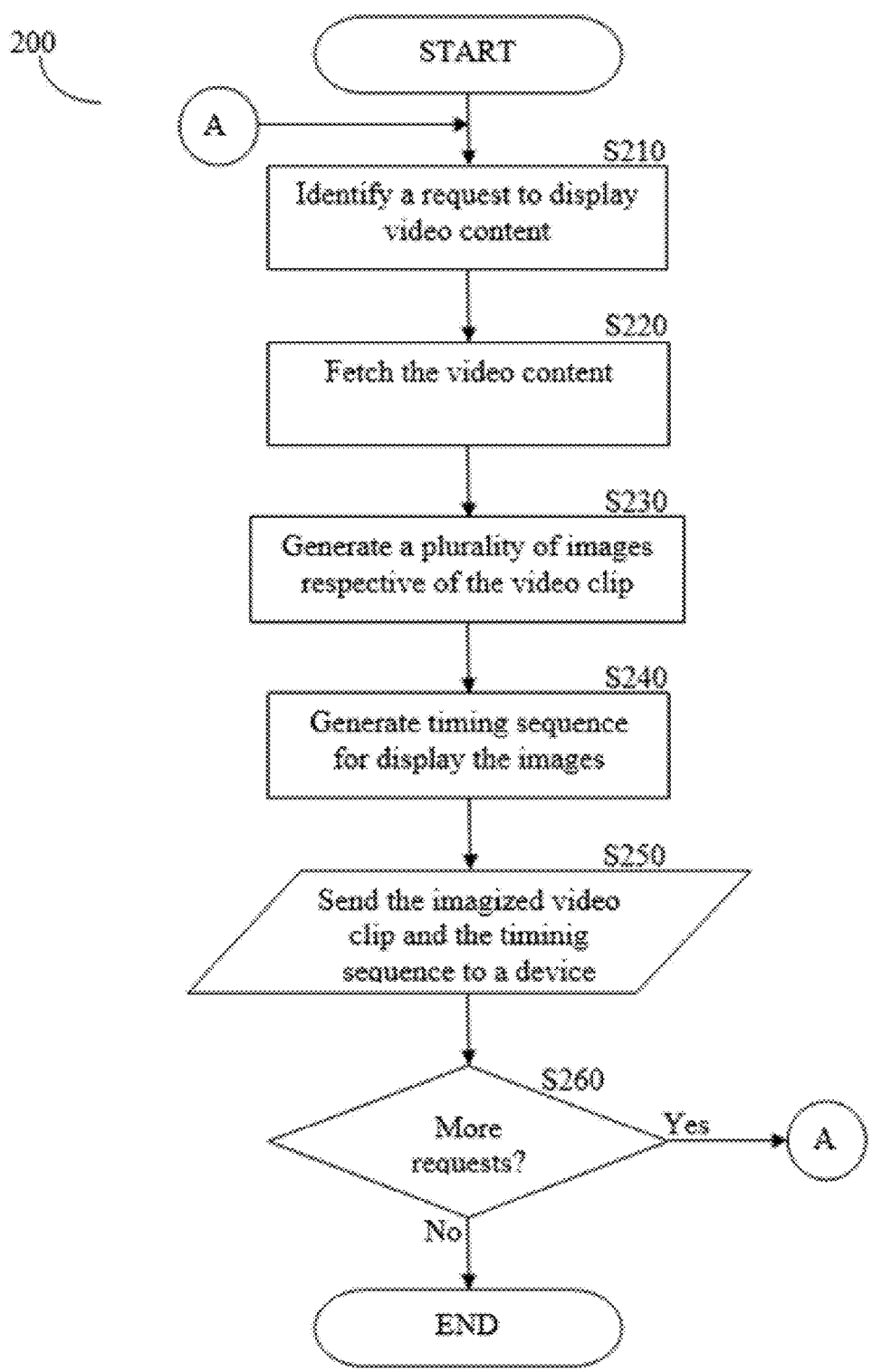
FIG. 2—is a flowchart of the operation of a system for generating imagized video clips respective of video content according to an embodiment.

FIG. 2 is an exemplary and non-limiting flowchart 200 of the operation of a system for generating image streams respective of video content according to an embodiment. In S210, the method starts when a request to display video content is received from a user device, for example, the user device 120.

In S220, the requested video content is fetched from a data source 140-1 through the network 110. In S230, a plurality of images are generated respective of the video content as further described hereinabove with respect of FIG. 1. In S240, a timing sequence for displaying the plurality of images as an imagized video clip on the display unit 125 of the user device 120 is generated. In S250, the imagized video clip and the timing sequence are sent for display on the display unit 125 of the user device 120. In S260, it is checked whether additional requests for video content are received from the user device 120 and if so, execution continues with S210; otherwise, execution terminates.

Figure 3:
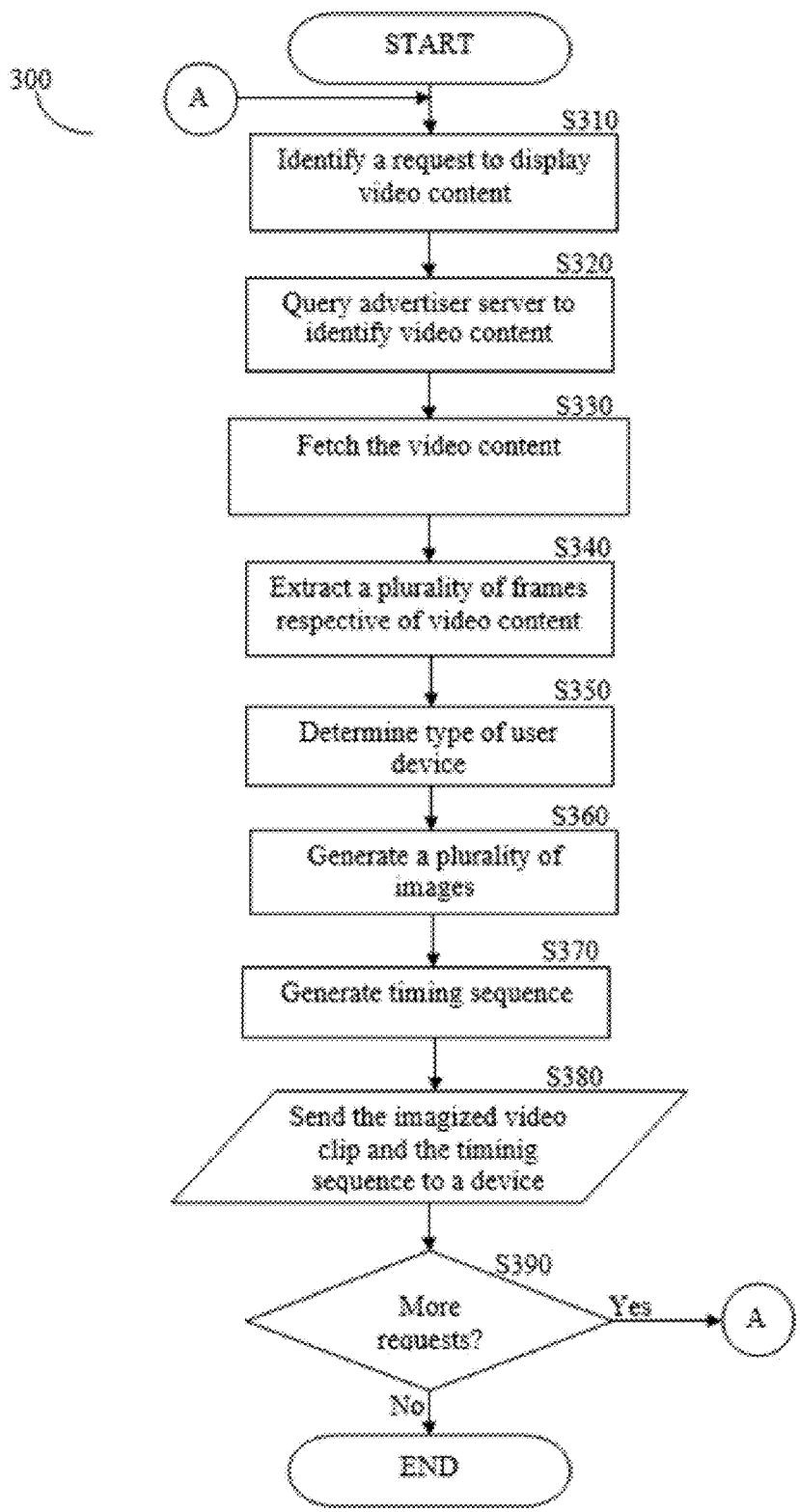
FIG. 3—is a flowchart of the operation of a system for displaying imagized video content according to an embodiment.

FIG. 3 is an exemplary and non-limiting flowchart 300 of the operation of a system for displaying video content according to an embodiment. In S310, the operation starts when a request to display a video content on a user device, for example, the user device 120 is received. The request may be received from, for example, an advertiser server 160 over the network 110. In S320, the advertiser server 160 is queried by the server 130 in order to identify the video content. In S330, the server 130 fetches the video content. The video content may be fetched from a data source of the one or more data sources 140 over the network 110. In S340, a plurality of frames are extracted respective of the video content. In S350, a type of the user device 120 is determined by the server 130. In S360, a plurality of images are generated respective of the extracted frames. In S370, a timing sequence for displaying each of the plurality of images as an imagized video clip on the display of the user device is generated. In S380, the imagized video clip is sent for display on a display of the user device 120. In S390, it is checked whether there additional requests and if so, execution continues with S310; otherwise, execution terminates.

FIG. 4 is an exemplary and non-limiting schematic diagram 400 of the operation of a system for displaying imagized video content according to an embodiment. An advertiser server 410 comprises at least one video clip 415 thereon. According to an embodiment, the system 100 receives 420 electronically a request from the user device 120 to display the video clip 415 on the display of the user device 120. The system 100 then analyzes the video clip 415 and generates a plurality of frames 425-1 through 425-n that comprise the video clip 415. The system 100 then generates 430 a plurality of images 435-1 through 435-m respective of the plurality of frames 425. Respective of the plurality of frames 425, the system is further configured to generate a timing sequence 437. Respective thereof, the system 100 can send over the network 110 the imagized video clip 435 and the timing sequence 437 to the user device 120.

It should be clear to one of ordinary skill in the art that the imagized video clip which is basically an emulated video tag of the video content, enables features which are typically unavailable while displaying video content on mobile user devices, such as, for example, automatic play (autoplay) of the video content, responsiveness (e.g., clickability), and more.

The principles of the disclosure, wherever applicable, are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program embodied in non-transitory computer readable medium, or any combination thereof, which may be executed by a CPU, whether or not such computer or processor is explicitly shown, to cause performance of operations described in this disclosure. Implementations may further include full or partial implementation as a cloud-based solution. In some embodiments certain portions of a system may use mobile devices of a variety of kinds. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for displaying a video clip on a display of a user device, the method comprising:
    identifying, by a server system, a request over a network from the user device to display the video clip on the display;
    fetching, by the server system, over the network the identified video clip;
    extracting, by the server system, from the fetched video clip its video content, wherein the video content is a plurality of frames;
    identifying, by the server system, that the video clip has a particular set of frames;
    determining, by the server system, that the user device is a first type of user device out of a plurality of possible types of user devices, the plurality of possible types of user devices also comprising a second type of user device, wherein:
        (i) the first type of user device is associated with a first set of frames,
        (ii) the second type of user device is associated with a second set of frames that is different than the first set of frames,
        (iii) the first set of frames is different than the particular set of frames in the video clip, and
        (iv) the second set of frames is different than the particular set of frames in the video clip;
    selecting, by the server system, the first set of frames for the first user device based on the user device being determined to be of the first type of user device;
    generating, by the server system, a plurality of images from the plurality of frames in order to form an imagized video clip, wherein the plurality of images fits the first set of frames selected for the user device, wherein one or more of the plurality of images is generated by compositing two or more frames of the plurality of frames into a single image;

generating, by the server system, a timing sequence for displaying each of the plurality of images of the imagized video clip on the display of the user device; and sending, by the server system, over the network the imagized video clip and the timing sequence to the user device such that the imagized video clip is autoplayed on the user device without user interaction, wherein the autoplay of the imagized video clip on the user device comprises a display of each of the plurality of images at moments in time specified by the timing sequence.

2. The computerized method of claim 1, wherein the request to display the video clip on a display includes a request for at least one of: a VPAID request, a request for a software development kit (SDK), a request to display the video clip on the display of the user device, and a request to display the video clip of the user device using an emulated video player.

3. The computerized method of claim 1, wherein the set of frames for the user device is smaller than the particular set of frames in the video clip.

4. The computerized method of claim 1, wherein sending over the network the imagized video clip and the timing sequence to the user device causes the user device to display the imagized video clip in an emulated video player on the user device.

5. The computerized method of claim 4, wherein the display of the video clip is in compliance with at least one of: Video Player Ad-Serving Interface Definition (VPAID), and Mobile Rich Media Ad Interface Definitions (MRAID).

6. The computerized method of claim 1, wherein the following operations are performed by a server that is remote from the user device:
(i) the identifying of the request,
(ii) the fetching of the identified video clip,
(iii) the extracting of the video content,
(iv) the determining that the user device is a first type of user device,
(v) the selecting the first set of frames,
(vi) the generating the plurality of images,
(vii) the generating the timing sequence, and
(viii) the sending the imagized video clip and the timing sequence.

7. The computerized method of claim 1, wherein the single image is not one of the plurality of frames of the video content.

8. The computerized method of claim 1, wherein the imagized video clip is autoplayed on the user device in an emulated video player.

9. The computerized method of claim 1, wherein the imagized video clip is autoplayed in an HTML 5 document and wherein HTML 5 is not configured to natively autoplay video files.

10. The computerized method of claim 1, wherein:
the particular set of frames in the video clip represents a particular number of frames per unit of time;
the first set of frames that is associated with the first type of user device represents a first number of frames per unit of time;
the second set of frames that is associated with the second type of user device represents a second number of frames per unit of time;
the particular number of frames per unit of time is different from the first number of frames per unit of time and from the second number of frames per unit of time; and the first number of frames per unit of time is different from the second number of frames per unit of time.

11. A computer system, comprising:
one or more processors; and
non-transitory computer readable medium including instructions that, when executed by the one or more processors, cause performance of operations that include:
identifying, by a server system, a request over a network from the user device to display the video clip on the display;
fetching, by the server system, over the network the identified video clip;
extracting, by the server system, from the fetched video clip its video content, wherein the video content is a plurality of frames;
identifying, by the server system, that the video clip has a particular set of frames;
determining, by the server system, that the user device is a first type of user device out of a plurality of possible types of user devices, the plurality of possible types of user devices also comprising a second type of user device, wherein:
(i) the first type of user device is associated with a first set of frames,
(ii) the second type of user device is associated with a second set of frames that is different than the first set of frames,
(iii) the first set of frames is different than the particular set of frames in the video clip, and
(iv) the second set of frames is different than the particular set of frames in the video clip;
selecting, by the server system, the first set of frames for the first user device based on the user device being determined to be of the first type of user device;
generating, by the server system, a plurality of images from the plurality of frames in order to form an imagized video clip, wherein the plurality of images fits the first set of frames selected for the user device, wherein one or more of the plurality of images is generated by compositing two or more frames of the plurality of frames into a single image;
generating, by the server system, a timing sequence for displaying each of the plurality of images of the imagized video clip on the display of the user device; and
sending, by the server system, over the network the imagized video clip and the timing sequence to the user device such that the imagized video clip is autoplayed on the user device without user interaction, wherein the autoplay of the imagized video clip on the user device comprises a display of each of the plurality of images at moments in time specified by the timing sequence.

12. The computer system of claim 11, wherein the request to display the video clip on a display includes a request requests for at least one of: a VPAID request, a request for a software development kit (SDK), a request to display the video clip on the display of the user device, and a request to display the video clip of the user device using an emulated video player.

13. The computer system of claim 11, wherein the set of frames for the user device is smaller than the particular set of frames in the video clip.

14. The computer system of claim 11, wherein the operations further comprise:
displaying the imagized video clip in an emulated video player on the user device.

15. The computer system of claim 14, wherein the display of the video clip is in compliance with at least one of: Video Player Ad-Serving Interface Definition (VPAID), and Mobile Rich Media Ad Interface Definitions (MRAID).

16. The computer system of claim 11, wherein the operations further comprise:
enabling auto-play of the imagized video clip on the user device when a web page is loaded by the user device without user interaction.

17. The computer system of claim 11, wherein the following operations are performed by a server that is remote from the user device:
(i) the identifying of the request,
(ii) the fetching of the identified video clip,
(iii) the extracting of the video content,
(iv) the determining that the user device is a first type of user device,
(v) the selecting the first set of frames,
(vi) the generating the plurality of images,
(vii) the generating the timing sequence, and
(viii) the sending the imagized video clip and the timing sequence.

18. The computer system of claim 11, wherein the single image is not one of the plurality of frames of the video content.

19. The computer system of claim 11, wherein the imagized video clip is autoplayed on the user device in an emulated video player.

20. The computer system of claim 11, wherein the imagized video clip is autoplayed on the user device in an emulated video player.

* * * * *

UNITED STATES PATENT AND TRADEMARK OFFICE
CERTIFICATE OF CORRECTION

PATENT NO.         : 9,992,528 B2
APPLICATION NO.    : 14/950057
DATED              : June 5, 2018
INVENTOR(S)        : Tal Melenboim Page 1 of 1

It is certified that error appears in the above-identified patent and that said Letters Patent is hereby corrected as shown below:

In the Claims

Column 8, Line 56, Claim 12, before "for" delete "requests".

Signed and Sealed this
Eleventh Day of December, 2018

Andrei Iancu
*Director of the United States Patent and Trademark Office*